(12) United States Patent
Koreis et al.

(10) Patent No.: US 6,568,541 B2
(45) Date of Patent: May 27, 2003

(54) TORTUOUS PATH FILTER

(75) Inventors: Joseph Koreis, Bellingham, WA (US);
Monte Koreis, Bellingham, WA (US);
Karl Thomas, Bellingham, WA (US)

(73) Assignee: Clarus Technologies Corp.,
Bellingham, WA (US)

( * ) Notice: Subject to any disclaimer, the term of this patent is extended or adjusted under 35 U.S.C. 154(b) by 0 days.

(21) Appl. No.: 09/930,002

(22) Filed: Aug. 14, 2001

(65) Prior Publication Data

US 2002/0000408 A1 Jan. 3, 2002

Related U.S. Application Data

(63) Continuation of application No. 09/408,411, filed on Sep. 29, 1999, now abandoned.
(60) Provisional application No. 60/102,586, filed on Sep. 30, 1998.

(51) Int. Cl.[7] .............................................. B01D 12/00
(52) U.S. Cl. ........................ 210/519; 210/521; 210/534; 134/109
(58) Field of Search ................................ 210/109, 111, 210/137, 196, 519, 521, 534, 535, 540; 134/109, 111

(56) References Cited

U.S. PATENT DOCUMENTS

| | | | | |
|---|---|---|---|---|
| 668,560 A | * | 2/1901 | Füllner | 210/535 |
| 973,357 A | * | 10/1910 | Lewis et al. | 210/519 |
| 1,647,344 A | * | 11/1927 | Cushman | 210/540 |
| 2,602,465 A | * | 7/1952 | Goehring | 210/519 |
| 3,353,676 A | * | 11/1967 | Hirsch | 210/519 |
| 3,370,714 A | * | 2/1968 | Trawinski | 210/521 |
| 4,157,096 A | * | 6/1979 | Miller, Jr. | 134/111 |
| 4,157,969 A | * | 6/1979 | Thies | 210/521 |
| 5,236,585 A | * | 8/1993 | Fink | 210/521 |
| 5,516,434 A | * | 5/1996 | Cairo, Jr. et al. | 210/211 |

FOREIGN PATENT DOCUMENTS

CH                 596099        * 2/1978

OTHER PUBLICATIONS

C&M Manufacturing, Inc., Pamphlet displaying, Portable Parts Washer, 1 page, (published prior to application filing date; no better date available).
TNRCC, Pamphlet displaying, TranSolvTM Model "CH" Solvent Recycling System, 1 page, (published prior to application filing date; no better date available).
ZYMO, Pamphlet displaying, ZYMO, Pamphlet displaying, ZYMO Bioremediation Parts Washer, 1 page, (published prior to application filing date; no better date available).
SystemOne Technologies Inc., Pamphlet displaying, System One 500 Series Recycling Parts Washer, 1 page, (published prior to application filing date; no better date available).

* cited by examiner

Primary Examiner—Christopher Upton
(74) Attorney, Agent, or Firm—Patrick M. Dwyer (57) ABSTRACT

A settling tank for clarifying washing fluids with one or more walls disposed within the tank, each wall having a plurality of passages and defining a settling chamber. Preferably there is a top mounted fluid runoff opening into the tank disposed above the innermost settling chamber and at least one pump inlet disposed in an upper part of the tank outside the outermost settling chamber. Passages in the inner wall are in a lower region of the wall, and the passages in the second wall are in an upper region of the wall, and at least some of the passages are hooded to enhance a flow velocity change for fluid passing through the passages. There is optionally a sump pump having a one way valve for discharging sump sediment from the sump into a portable waste can. There is also preferably a sump tube generally curved upwardly and away from a bottom of the sump, and to which the pump is connected.

Some embodiments will have a fluid pump connected to the pump inlet, with the pump controlled to operate only during fluid runoff into the tank, the better to enhance settling of particles and heavier greases and oils during periods when the washer is not in use.

17 Claims, 4 Drawing Sheets

TORTUOUS PATH FILTER

This application claims priority to provisional patent application No. 60/102,586 filed Sep. 30, 1998 and application Ser. No. 09/408,411 filed Sep. 29, 1999, now abandoned.

TECHNICAL FIELD

The invention relates to the field of washing equipment and washing fluid reclamation; more particularly, it relates to a tortuous path filter for sedimentation and clarification of washing fluids, and to an optional sump and solid waste discharge.

BACKGROUND OF THE INVENTION

In the vehicle repair and maintenance industry, as well as in other industries in which equipment and parts become dirty and/or greasy, such as for military weapons maintenance, it is common to employ some kind of washing apparatus for dirty parts and assemblies and some kind of cleaning fluid or solvent for use in the washing equipment. Typically the fluid is expensive, especially for fluids optimized for environmental impact and for safety and health of workers. It is thus advantageous to be able to reuse and/or recycle such fluid.

During the degreasing and cleaning process in the parts washer, the cleaning fluid invariably becomes contaminated with larger and smaller particles of dirt and worn metal and globules of heavier greases and oils. To maintain the cleaning effectiveness of the fluid it is considered essential to filter out or otherwise remove from time to time some or all of such contaminants from the fluid.

Some parts washers are equipped with means to filter and/or distill the cleaning fluid and thus separate the contaminants, either continuously or in a batch process during down time. Examples include the System One 500 Series parts washer from Mansur Industries in Miami, Fla., and TranSolv's Model CH solvent recycler. However, direct filtering of contaminated washing fluid generally causes premature overload of filter canisters, necessitating frequent replacement of the canisters. Other washing installations employ separate distillation equipment. Some sites employ mobile fluid recycling services who, either on or off site, filter and/or distill the cleaning fluid from the on site parts washers. The Zymo company even provides a parts washer with built in bioremediatioin of the cleaning fluid, while another company provides a built in centrifugation system to filter out contaminants. All of these fluid recovery or recycling processes are expensive and laborious, and many of them require considerable down time for each parts washer while the fluid is cleaned.

What is needed is a solvent recycling system that is inexpensive in operation, labor free, requires little or no down time in operation, and is safe for workers and for the environment, with minimal need for, or long intervals between, solvent and/or canister filter replacement.

DISCLOSURE OF THE INVENTION

Accordingly, it is an object of the invention to provide a solvent recycling system that is inexpensive in operation, labor free, requires little or no down time in operation, and is safe for workers and for the environment, with minimal need for, or long intervals between, solvent, and/or canister filter replacement.

It is a further object of the invention to provide a filtering stage for a multistage filtering system that will inhibit clogging of finer downstream filters.

It is another object of the invention to provide a settling tank for clarifying washing fluids with a wall disposed within the tank, the wall having a plurality of passages and defining a settling chamber.

It is another object of the invention to provide a settling tank with a top mounted fluid runoff opening into the tank disposed above a settling chamber and at least one pump inlet disposed in an upper part of the tank outside the settling chamber.

It is a further object of the invention to provide a settling tank with an inner wall defining a central settling chamber and a second wall surrounding the inner wall and defining a second settling chamber between the inner wall and the second wall, each wall having a plurality of passages and with the pump inlet disposed outside the second wall.

It is another object of the invention to provide a settling tank with the passages in the inner wall in a lower region of the wall, and the passages in the second wall in an upper region of the wall, with at least some of the passages hooded to enhance a flow velocity change for fluid passing through the passages.

It is a further object of the invention to provide a settling tank with a sump pump having a one way valve for discharging sump sediment from the sump into a portable waste can.

It is a further object of the invention to provide a fluid pump connected to the pump inlet, with the pump controlled to operate only during fluid runoff into the tank, the better to enhance settling of particles and heavier greases and oils during periods when the washer is not in use.

It is yet another object of the invention to meet any or all of the needs summarized above.

These and such other objects of the invention as will become evident from the disclosure below are met by the invention disclosed herein.

The invention addresses and provides such a system. The invention represents the only parts washer with built in low cost solvent recycling by means of a tortuous path, multi-chambered settling tank, whereby sludge and other settled contaminants may be removed without removing the fluid from the washer and without substantial interruption to the operating cycle of the washer.

In one aspect of the invention there is a settling tank for clarifying washing fluids. There is preferably at least one wall disposed within the tank, the wall having a plurality of passages therethrough. The wall may be further comprised of wall pieces joined together with appropriate angles and seams, or it may be a substantially single piece folded or bent appropriately, in either case so to define at least one separate settling chamber within the settling tank. The walls of the settling tank and of the settling chamber(s) are preferably substantially vertical, or at least funnel or cone shaped. The settling chamber wall(s) preferably run in height from a point at or above an upper fluid fill limit line in the settling tank to point(s) at or just above respective line(s) at which the plane(s) of the settling chamber wall(s) intersect the wall(s) of the settling tank, or, if optionally provided, the settling tank bottom.

Preferably there is a top mounted fluid runoff opening into the settling tank disposed generally and substantially above the settling chamber, or the central most settling chamber if there are more than one. In preferred embodiments, the fluid runoff is a perforated drain plate that is in fluid communication with a washing surface above the settling tank. Preferably there is also at least one pump inlet disposed preferably in an upper part of the settling tank outside any of the settling chambers. In preferred embodiments there is more than one settling chamber, with an inner wall defining a central settling chamber and a second wall surrounding the inner wall and defining a second settling chamber between the inner wall and the second wall. A referred embodiment is thus a nested settling chamber arrangement, where no settling chamber wall is coplanar with or touching any other settling chamber wall, or the settling tank wall. It will be appreciated however that other embodiments, including those with settling chamber walls touching or in common with each other or with the settling tank, or with non nested, non symmetrical, and/or non centered settling chambers, may also be employed to some particular advantage without departing from the scope of the invention.

As above, each settling chamber wall preferably has a plurality of passages therethrough, each passage in fluid communication with the settling chamber defined by its wall and with the next most outer settling chamber or settling tank respectively. Where there is more than one settling chamber, any pump inlets are preferably disposed outside the outermost settling chamber wall.

Preferably the passages in the innermost settling chamber wall are in a lower region of the wall, and the passages in the second, or nextmost, inner, settling chamber wall are in an upper region of the wall, and so forth in alternation for each successive nextmost inner settling chamber wall, in order best to extend a flow path for the sediment carrying fluid from its entrance into the settling tank to its eventual pickup at one of the pump inlets. Alternatively, the passages in the innermost settling chamber wall may be in an upper region of the wall, and the passages in the second, or nextmost inner, settling chamber wall may be in a lower region of the wall.

At least some of the passages referred to above are preferably hooded, or otherwise partially flow shielded, to enhance a flow velocity change for fluid passing through the passages. Such hooded passages may advantageously employ an anti-flow facing hooded, or an anti-flow oriental tubing, or the like. Preferably the second, or outermost settling chamber, wall is devoid of passages in a blank region of the wall facing, or most proximate, the pump inlet.

Preferably there is also a set off between a bottom of one or more of the walls and the tank to allow settling contaminants in the tank and in outer settling chambers to have a settling path to the sump. The tank is also preferably substantially funnel shaped to enhance contaminant sliding to the sump, the funnel being any of several possible shapes including conical and also square or flat sided. The tank further has a sediment holding sump disposed at a bottom part of the tank substantially beneath a settling chamber, and preferably beneath the centralmost settling chamber. The sump is also preferably substantially funnel shaped.

There is also provided a sump pump having a one way valve for discharging sump sediment from the sump into a portable waste can. The sump pump may advantageously be a simple manual suction pump, or may be an electric or other powered sediment pump. To enhance sediment withdrawal and conserve fluid loss, there is also preferably a sump tube generally curved upwardly and away from a bottom of the sump, and to which the sediment pump is connected.

Preferred embodiments will have a fluid pump connected to the pump inlet, with the pump controlled to operate only during fluid runoff into the tank (that is, during washing as fluid and contaminants pass through the drain from a washing surface and down into the settling tank), the better to enhance settling of particles and heavier greases and oils during periods when the associated washer is not in use.

There is optionally provided a constant pressure washer outlet apparatus comprising a reservoir (preferably in the form of a settling tank), a pump, a conventional canister type filter and a washer outlet, all connected for fluid flow therethrough from the reservoir on through the washer outlet, and further comprising a bypass valve between the filter and the washer outlet. The valve preferably has a fluid return to an inlet, of the pump, and the valve is operable to vent fluid to the pump return at a preset pressure setting to maintain a constant pressure delivery (at the preset pressure) to the washer outlet. A sensor is optionally associated with the bypass valve, or elsewhere in the fluid flow path, to detect a preset 'low pressure' condition and to initiate an auto shut off sequence for the pump on detection of the low pressure condition.

BEST MODE OF CARRYING OUT THE INVENTION

Turning now to the drawings, the invention will be described in preferred embodiments by reference to the numerals of the drawing figures wherein like numbers indicate like parts.

Figure 1:
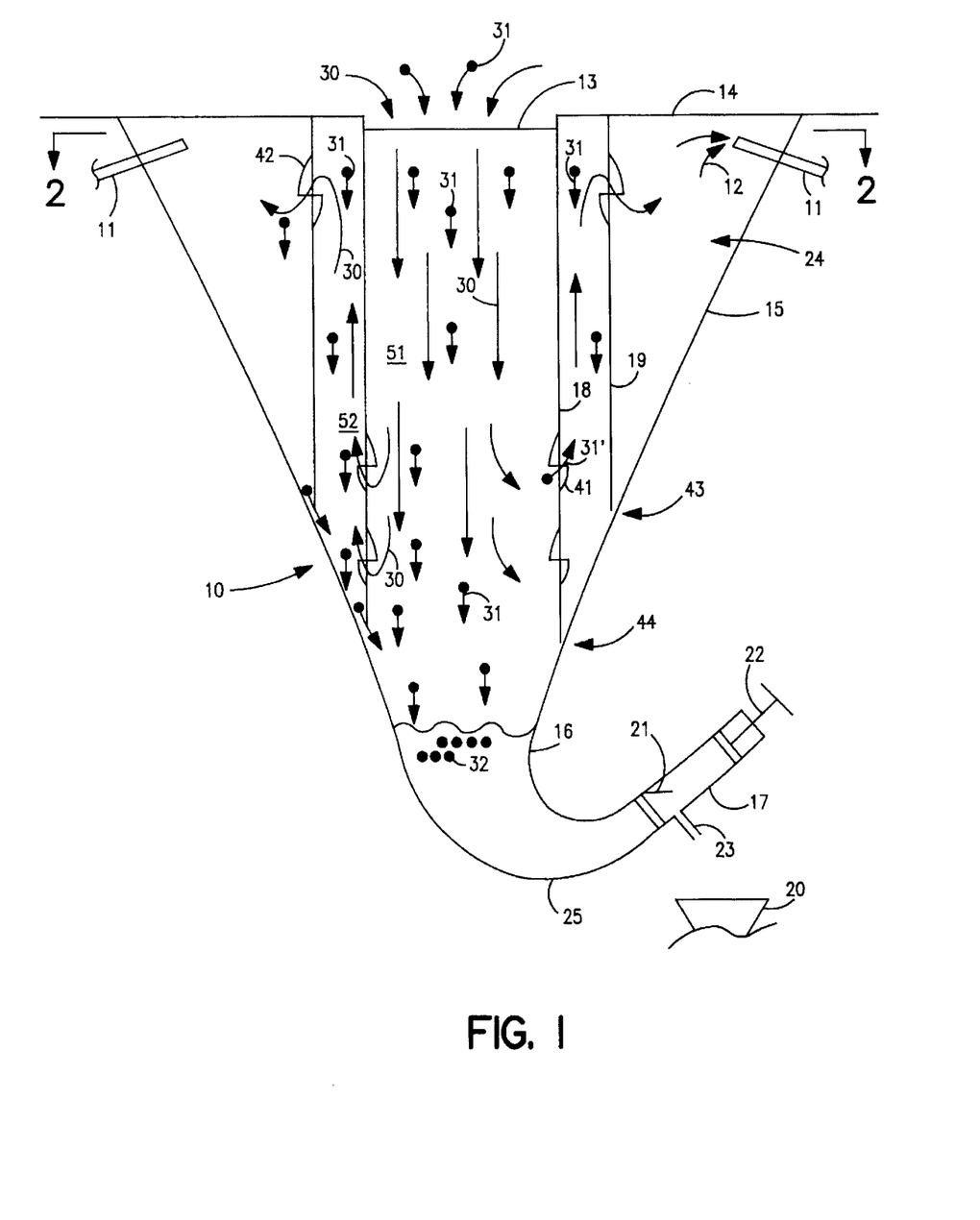
FIG. 1 is an elevational sectional schematic of a preferred embodiment of the invention.
Figure 2:
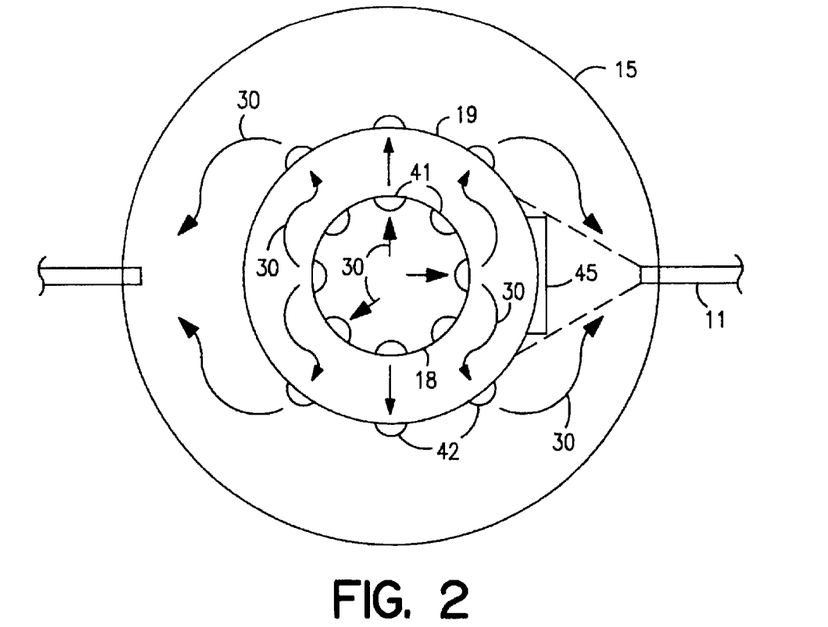
FIG. 2 is a schematic plan view of the embodiment shown in FIG. 1.

FIG. 1 is an elevational sectional schematic of a preferred settling tank and tortuous path filter 10. FIG. 2 is a plan view of filter 10. Tank 15 is generally funnel shaped and may be conical or rectilinear as long as it generally tapers from top to bottom. Tank 15 is generally filled with an appropriate solvent, preferably safe for worker and environment alike, the selection of which is within the knowledge of those skilled in the art. Tank 15 is typically covered by work surface 14 which preferably is dished or sloped or biased towards its center, and in its center there is a drain cover 13 having holes or passages sized to catch larger debris such as bolts, nuts, firing pins and the like. Alternate side arrangements of drain 13 and sloped or dished top 14 may be applied without departing from the scope of the invention.

Near the top of tank 15, and preferably just below the typical fill level of fluid in tank 15 where, as described below, the fluid is most likely to be relatively quiescent, are one or more pump inlets 11 which draw in fluid to the pump (not shown) along fluid flow lines 12. Many conventional systems are based on the idea that fluid should be agitated as much as possible to stir up the sediment, so that the agitated and thus entrained sediment can be pumped and then filtered. In the filter disclosed, pumping, agitation and stirring of sediment are all minimized, and a functional, gravity-based, sediment settling and removal system is instead employed.

Washer fluid and fluid contaminants flow down drain 13 through sized perforation holes (not shown) along fluid flow arrows 30 and contaminant flow arrows 31, respectively, into a generally centrally located settling chamber 51 defined by inner wall 18. Fluid flow throughout tank 15 is generally induced by fluid withdrawal out fluid exit(s) or pump inlet(s) 11, and contaminant flow is generally induced primarily by gravity, with some influence on contaminant flow from fluid flow velocity vectors 30.

For the most part, and especially when there is no pumping action, as is preferably the case when there is no washing going on, contaminants 32 will drop to sump 16 under the influence of gravity; during pump cycling however, some contaminants will be induced by or caught by fluid flow and pulled to the side and out the passages 41 in the inner wall (for example, see contaminant arrow 31'). This effect is substantially reduced by shielding or hooding the passages in an anti-flow direction, as better illustrated in FIGS. 3 and 4.

In general it is believed that as the velocity vector of a given quantum of fluid changes (that is, a flow velocity change), such as when the fluid is drawn into and through a passage in wall 18 from settling chamber 51 to settling chamber 52 (see curved arrows 30), and especially when the fluid is drawn against, and through an anti-flow facing shield, tube or hood, the entrained contaminants 31 will tend, under the influence of gravity and inertia, to continue in a downward direction and become disengaged from the entraining force of that fluid vector. Secondarily, it is believed that, in addition to a substantial vector change in direction that is induced by the anti-flow facing shields or hoods, there is also a vector change in absolute velocity, as the fluid necessarily, it is believed, slows to make the turn. This velocity slowing further contributes to a release of contaminants 31 to continue their downward progress to the sump.

Preferred embodiments of the invention have a second wall 19 which surrounds wall 18 and defines a second settling chamber 52 outside the inner or central settling chamber 51 defined by wall 18. Also preferably the passages in wall 18 are low, while the passages in wall 19 are high. Thus, as fluid enters tank 15 through drain 13, it must first flow most of the way down first settling chamber 51, drawing contaminants 32 with it toward sump 16, where it is then drawn through passages 41 into the second settling chamber 52 and thence upwardly along most of the height of settling chamber 52 to passages 42 in wall 19. Finally the fluid can flow over to pump inlets 11.

This tortuous path of fluid flow leaves many opportunities for contaminants 32 to sink or otherwise break free of the pull of fluid flow 30 to contain downwardly to sump 16. At every turn of fluid flow, whether from attendant slowing of fluid before passing through passages 41 or 42, or from directional change of the fluid as it turns sharply to enter and pass through hooded passages 41 or 42, the contaminants are urged by gravity and inertia to seek their own path to sump 16.

Walls 18 and 19 extend nearly to the bottom of tank 15, and are desirably spaced from tank 15 at their lower edges by set offs 44 and 43 respectively. Set offs 44 and 43 provide exit paths for the relatively smaller quantity of contaminants finding their way into the second chamber or even into the tank in general. To further enhance the length of the settling path for fluid flow 30, wall 19 advantageously has no passages that face any of the pump inlets 11. A blank region 45 of wall 19 serves this purpose (see FIG. 2). The blank region of the wall facing the pump inlet may be defined by an imaginary cone (see dotted lines proximate region 45 in FIG. 2) having a preferred vertex angle between 45 and 90 degrees, with the vertex of the cone placed at the pump inlet in the tank and the axis of the cone substantially aligned along a line normal (perpendicular) to the wall and projected from the pump inlet to the wall.

It will be appreciated that other arrangements of tortuous path involving multiple chambers and offset passages, including horizontally offset passages (not shown), and with or without vertical offset, may optionally be substituted for the arrangement disclosed as preferred without departing from the scope of the invention.

As contaminants 32 fill sump 16, they are preferably drawn off through generally upwardly sloping tube 25 into valved pump 17. Pump 17 has conventional one way valve 21 for admitting sludge under the influence of the pressure differential caused by withdrawing handle and plunger 22, such that reversing the direction of handle 22 forces sludge out discharge 23 into portable waste can 20. A low stroke volume pump is preferred, selection of which is believed to be within the skill of those in the art.

Figure 3:
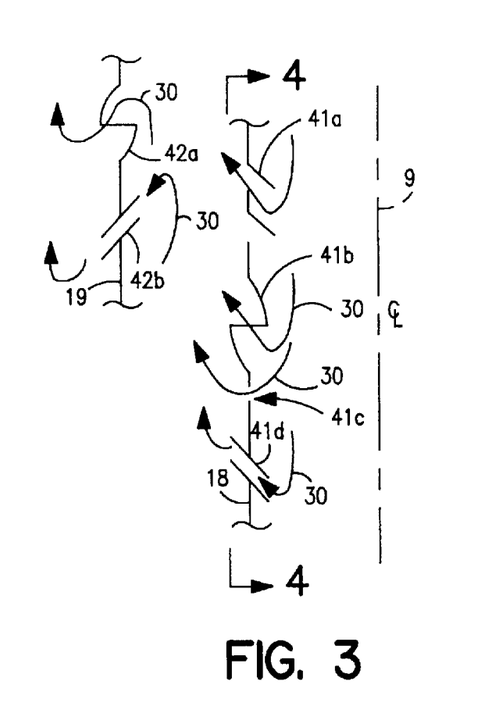
FIG. 3 is a detail of selected features of the invention shown in FIG. 1.
Figure 4:
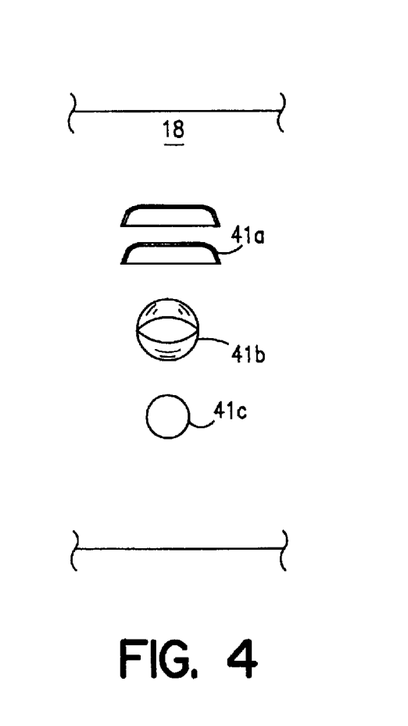
FIG. 4 is a schematic elevation of features detailed in FIG. 3.

FIGS. 3 and 4 show optional details of passages 41 and 42. In inner wall 18, passages 41 can be in any of several forms, shown as 41*a,b,c,d* or the like. Passage 41*a* is anti-flow facing and hooded toward centerline 9 to shield the passage from easy entry of entrained contaminants as they flow downwardly along wall 18. The anti-flow facing hood has the desirable effect of deflecting contaminant particles away from the actual passage so that fluid flow 30 is relatively cleaner, with less entrained contaminants. Similarly passage 41*b* is hooded against the direction of flow (upper hood) and then scooped beneath the upper hood in the direction of flow. Passage 41*c* is optionally not hooded. Passage 41*d* is an optional embedded slanted tube, cut at an angle to function similarly to anti-flow facing hooded passages 41*a* and 41*b* (observe curved arrow 30 believed to be typical of flow that must pass through tube 41*d*).

In second wall 19, passages 42 can likewise be in any of several forms, shown as 42*a* and 42*b* or the like. In addition, analogs of passages 41 can be effectively employed as well in wall 19. Passage 42*a* is basically the same as passage 41*a*, but oriented optimally for the predominantly upward flow 30 of fluid in second chamber 52, especially when the passages in) the two walls are vertically offset as described above. That is, passage 42*a* is hooded to shield the passage from easy entry of entrained contaminants as they flow upwardly along wall 19. Passage 42*b* is an embedded tube like tube 41*d*, but oriented in a functionally opposite orientation. Passages 41*a*, 41*b*, 41*c*, and 42*a* are formed by well known metal forming methods, and selection of materials from which the filter 10 are made is believed to be within the knowledge of those skilled in the art.

Figure 5:
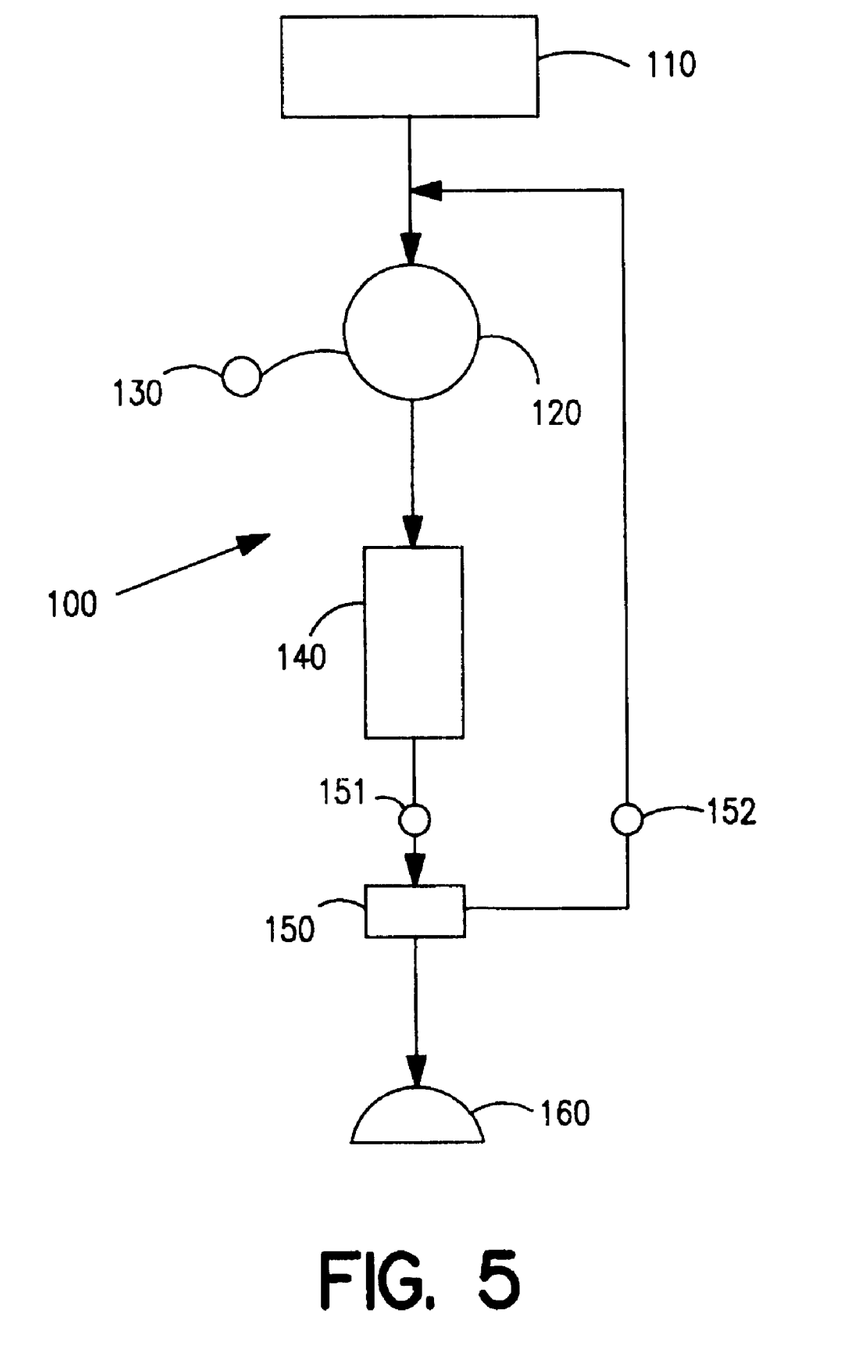
FIG. 5 is a flow diagram for fluid flow in a preferred embodiment of the invention.

FIG. 5 is a schematic diagram of fluid now through the components of a parts washer 100 embodying the invention, detailing the several intermittent flow functions of filter 10. Fluid is drawn by conventional pump 120 from reservoir 110 (i.e., settling tank 15) under the control of conventional sensor and control unit, 130. Preferably unit 130 is a conventionally proximity sensor and switching logic set to activate pumping when an operator is at the washer, but which otherwise shuts off the pump when no one is there. This provides maximum quiescent time for contaminants to settle, as opposed to conventional systems which leave the effect of constantly stirring the contaminants along with the fluid.

Pump 120 forces fluid through conventional microfilter 140 and out parts washing fluid outlet 160. Bypass valve 150 is interposed however between filter 140 and outlet 160 to maintain a constant, pressure washing system by venting excess pressure. In conventional systems, when the filter is new and clean, pressure is relatively high, but gradually climbing as the filter begins to clog. This effect is exacerbated by attempts to design in a high enough initial pump pressure to compensate for some period of time for the gradual clogging of the filter. In the disclosed constant pressure system, the pressure at the washer fluid outlet is always the same, until a clogged filter causes the pressure in the system to drop below a preset pressure value, at which time a shut down sequence initiates, preferably beginning with a series of warning lights or other suitable indicators, and concluding with an automatic shut down of the pump.

This constant pressure is effected by bypass valve 150 which shunts all pressure equal to or greater than a reset value (say, 20 psi) by opening a flow return to the pump inlet, or back to the reservoir. Thus pressure at outlet 160 is always at, or just below, 20 psi. Then as the filter nears the end of its useful life, sensor 151 detects the resulting substantial pressure drop below 20 psi and initiates the shut down sequence. Alternatively, sensor 152 in the return line detects a 'no flow' or 'low flow' condition in the line, also symptomatic of the bypass valve having closed for lack of pressure, and likewise initiates a shut down.

Figure 6:
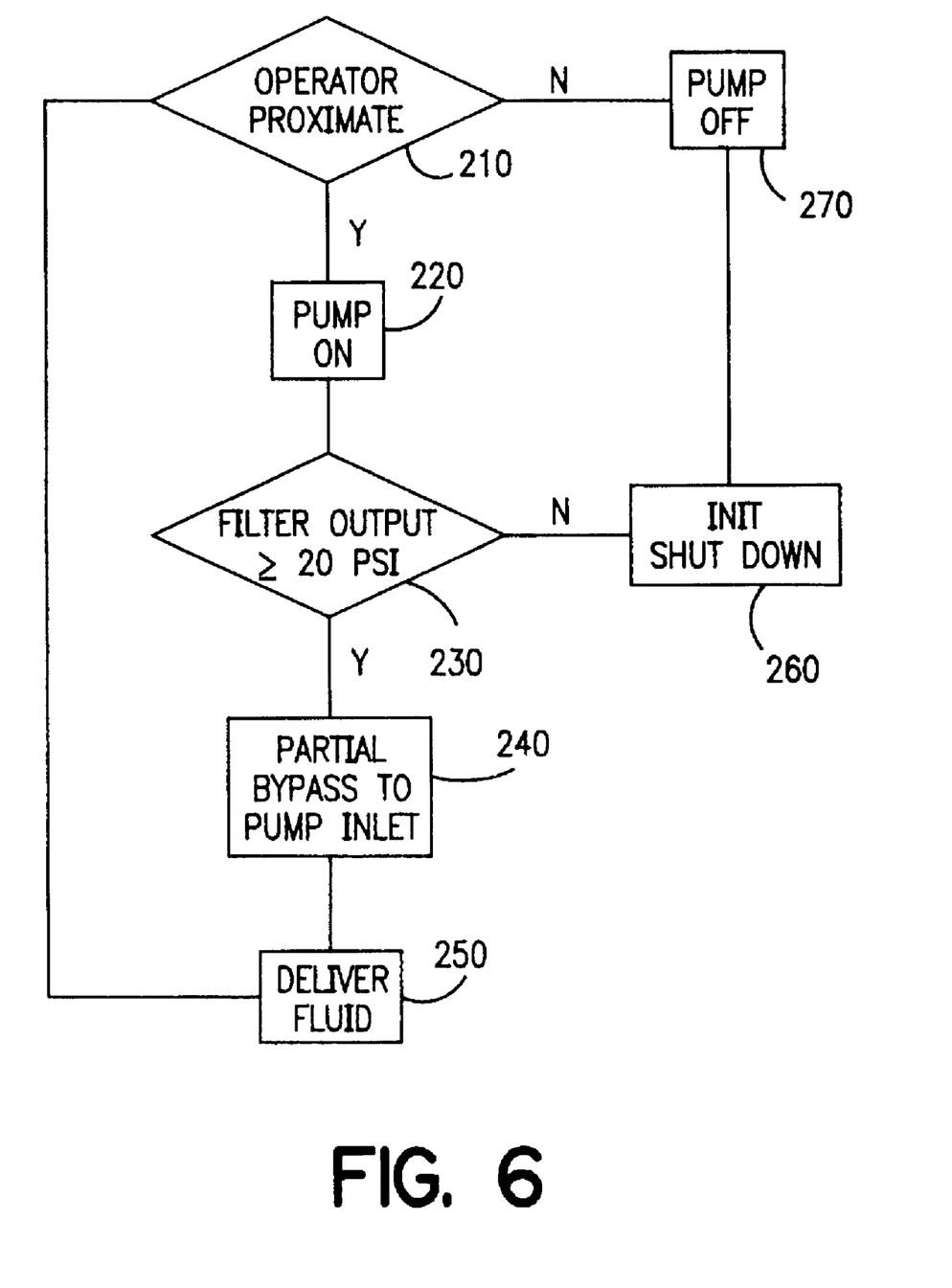
FIG. 6 is a flow chart for operation of the pump aspect of the invention.

FIG. 6 shows a logic flow chart, for washer system fluid flow as affected by operator presence and/or filter clogging. If an operator is proximate in step 210, the pump switches on in step 220; otherwise it turns off, or stays off, in step 270. With the pump on, when the filter output pressure is greater than or equal to say 20 psi in step 230, there is a partial bypass flow allowed to the pump inlet (see FIG. 5) in step 240 and fluid is delivered for washing at step 250 and the logic sequence repeats to step 210; otherwise when the pressure is below 20 psi, a shut down sequence as described above is initiated in step 260 and terminates at step 270.

EXAMPLE

Clarus® washers incorporating the disclosed tortuous path filter, model numbers PCS 25 and WCS 25 were employed in a series of field tests for automotive parts cleaning and small arms weapons cleaning, with nearly identical results for both models. Judgment of overall effectiveness of the parts washers tested was based on their ability to keep overall costs down in terms of waste and microfilter disposal cost, microfilter replacement cost, and cost of disposal and maintenance associated labor, and relative useful life of the washing solvent.

At the outset, some cost advantage is realized in that comparable conventional solvent type washers require an initial solvent filling of 55 gallons, while the Clarus washers require only 27.5 gallons. Initial set up cost of the Clarus washers is thus only 50% of the corresponding cost, for conventional washers.

In operation, waste solvent disposal costs using the Clarus washers was significantly reduced compared to conventional washers, due to superior performance in three areas:

The relatively smaller solvent volume of the Clarus washers insures that even if 100% of the solvent is disposed of to waste, disposal (and replacement) still costs only half of what conventional washers cost in this respect.

During a test involving cleaning of hundreds of small arms in each of two washers, one Clarus and one conventional, the conventional washer had to have its microfilters replaced 22 times, while the Clarus microfilters were not replaced at all, and the Clarus washer pumped 'water clear' solvent during the entire test. On the other hand the conventional washer's solvent was so degraded at the mid point of the test that it required a complete replacement of the entire solvent volume.

As degradation of solvent is known to be at least in part due to surface are exposure of the solvent to contaminants, and as conventional washers, to the extent the contaminants are allowed to settle at all, form a high surface area sludge layer on the bottoms of their tanks, the Clarus washers were less prone to solvent degradation from contact with settled contaminants. In addition, only the Clarus washer provided for sump dump of settled contaminants without appreciable loss of good solvent.

Field observations during testing noted that about 90% of all contaminants introduced into the Clarus washer become trapped in the sump where it could most inexpensively be disposed of, leaving very little contamination to clog the microfilters or remain suspended in the solvent.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The tortuous path filter and pumping system disclosed may employed throughout the world in all industries and applications were parts or equipment are washed with solvent based fluids. Use of the filter and pumping system disclosed will promote cost savings from reduced or delayed clogging of microfilters, and promote environmental health in requiring less fluid overall, since it needs replacing only infrequently. In addition, the continuous action of the filter promotes increased available working time, with little or no down time, thus further enhancing productivity.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A settling tank for clarifying washing fluids comprising:
   a wall disposed within the tank, the wall having a lower edge and a plurality of passages and defining a settling chamber, the lower edge of the wall extending nearly to the bottom of tank and spaced from the tank by a set off;
   a top mounted fluid runoff opening into the tank disposed above the settling chamber;
   at least one fluid exit disposed in an upper part of the tank outside the settling chamber; and
   a sediment holding sump disposed below the lower edge of the wall at a bottom part of the tank, the sump positioned substantially beneath the settling chamber.

2. The apparatus of claim 1 further comprising an inner wall defining a central settling chamber below the top mounted fluid runoff opening, and a second wall surrounding the inner wall and defining a second settling chamber between the inner wall and the second wall, each wall having a lower edge and a plurality of passages therein, the lower edge of each wall extending nearly to the bottom of tank and spaced from the tank by a set off, wherein the fluid exit is disposed outside the second wall, and wherein the sump is positioned substantially beneath both settling chambers.

3. The apparatus of claim 2 wherein the passages in the inner wall are in a lower region of the wall, and the passages in the second wall are in an upper region of the wall.

4. The apparatus of claim 2 wherein the second wall further comprises a blank region of the wall facing the pump inlet.

5. The apparatus of claim 4 wherein the blank region of the wall facing the pump inlet is defined by a cone having a vertex angle between 45 and 90 degrees, with the vertex placed at the pump inlet in the tank and the axis of the cone substantially aligned along a line normal to the wall and projected from the pump inlet to the wall.

6. The apparatus of claim 1 wherein at least some of the passages are anti-flow shielded.

7. The apparatus of claim 6 wherein a shielded passage comprises an anti-flow facing hood.

8. The apparatus of claim 6 wherein a shielded passage comprises an anti-flow oriented tubing.

9. The apparatus of claim 1 wherein the tank is substantially funnel shaped.

10. The apparatus of claim 1 wherein the sump is substantially funnel shaped.

11. The apparatus of claim 10 further comprising a sump pump having a one way valve for discharging sump sediment from the sump.

12. The apparatus of claim 11 further comprising a sump tube generally curved upwardly and away from a bottom of the sump, the sump pump connected to the sump tube.

13. The apparatus of claim 1 further comprising a fluid pump controllable to operate only during fluid runoff into the tank, the pump connected to the tank fluid exit.

14. A settling tank for clarifying washing fluids comprising:
- a inner wall disposed within the tank, the wall having a lower edge and a plurality of passages and defining a central settling chamber below a top mounted fluid opening into the tank;
- a second wall surrounding the inner wall and defining a second settling chamber between the inner wall and the second wall, the second wall having a lower edge and a plurality of passages, the lower edges of both walls extending nearly to the bottom of tank and spaced from the tank by a set off for each wall;
- a sediment holding sump disposed below the lower edges of the walls at a bottom part of the tank, the sump positioned substantially beneath both settling chambers; and
- a fluid exit disposed in an upper part of the tank outside the second wall.

15. The apparatus of claim 14 wherein the passages in the inner wall are only in a lower region of the wall, and the passages in the second wall are only in an upper region of the wall.

16. The apparatus of claim 14 wherein at least some of the passages are anti-flow shielded.

17. The apparatus of claim 16 wherein a shielded passage comprises an anti-flow facing hood.

* * * * *

UNITED STATES PATENT AND TRADEMARK OFFICE
CERTIFICATE OF CORRECTION

PATENT NO.     : 6,568,541 B2
DATED          : May 27, 2003
INVENTOR(S)    : Joseph Koreis et al.

It is certified that error appears in the above-identified patent and that said Letters Patent is hereby corrected as shown below:

<u>Title page, Item [54] and Column 1, line 1,</u>
Should read -- PARTS WASHER WITH TORTUOUS PATH SETTLING CHAMBER --

Signed and Sealed this

Ninth Day of September, 2003

JAMES E. ROGAN
*Director of the United States Patent and Trademark Office*